US006490283B1

(12) United States Patent
Ganor et al.

(10) Patent No.: US 6,490,283 B1
(45) Date of Patent: Dec. 3, 2002

(54) COMMUNICATION SYSTEM WITH COMMUNICATION CONTROLLER AND MULTIPLE PHYSICAL INTERFACES, AND METHOD

(75) Inventors: Avraham Ganor, Shoham (IL); Avi Shalev, Tel Aviv (IL); Vadim Vayzer, Petach-Tikva (IL); Avi Hagai, Ranana (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/348,101

(22) Filed: Jul. 6, 1999

(51) Int. Cl.[7] .......................... H04L 12/28; H04L 12/56
(52) U.S. Cl. .................... 370/395.1; 710/305; 370/475; 370/395.1; 370/469
(58) Field of Search ................................ 370/396, 398, 370/395, 475, 395.1, 469, 362–364, 437–439; 710/305, 306

(56) References Cited

U.S. PATENT DOCUMENTS

| 5,418,786 A | | 5/1995 | Loyer et al. ................... 370/94 |
| 5,485,456 A | * | 1/1996 | Shtayer et al. ................. 370/60 |
| 5,742,765 A | | 4/1998 | Wong et al. ............. 395/200.6 |
| 5,889,778 A | * | 3/1999 | Huscroft et al. ............ 370/395 |

FOREIGN PATENT DOCUMENTS

GB 2303521 A 2/1997 ........... H04Q/11/04

OTHER PUBLICATIONS

The ATM Forum Technical Committee, Utopia Level 2, Version 1.0, ac–phy–0039.000, Jun. 1995, pp. ii nd iii and pp. 1–66.

Asynchronous Transfer mode networks, Performance Issues, Second edition, Raif O. Onvural, Artech House, Boston, London pp 60–75.

* cited by examiner

*Primary Examiner*—Ajit Patel
*Assistant Examiner*—Raj Jain
(74) *Attorney, Agent, or Firm*—Robert L. King (57) ABSTRACT

A communication system (600) has a first processor (210) and a second processor (220). The first processor (210) has a first number of address bits (e.g., A=5) to select a first device (651), and the second processor (220) has a second number of address bits (e.g., B=4 to select a second device (661). The processors (210, 220) are coupled to the devices (651, 661) by a shared bus (640) with a total number of bit lines (641–648) which is smaller than or equal to the sum of the first and second numbers of bits (e.g., N=8). The bit lines (641–648) are assigned to a first outer set (641–643), a second outer set (646–648) and to an inner set (644–645). LSB-bits from the first processor (210) are coupled to the first outer set (641–643), LSB-bits from the second processor (220) are coupled to the second outer set (646–648), and MSB-bit of first and second processors (210, 220) are multiplexed to the lines of the inner set (644–645).

11 Claims, 6 Drawing Sheets

COMMUNICATION SYSTEM WITH COMMUNICATION CONTROLLER AND MULTIPLE PHYSICAL INTERFACES, AND METHOD

FIELD OF THE INVENTION

The present invention generally relates to communication systems, and, more particularly, to a communication system having a communication controller and multiple physical interfaces, and to a method.

BACKGROUND OF THE INVENTION

In many communication systems, a physical interface (e.g., a "PHY", or "physical layer device") connects a communication channel (e.g., fiber optic line, phone line, radio link) to a communication processor. For example, the system operates in the Asynchronous Transfer Mode (ATM) in which the channels transfer data in cells (e.g., blocks of bytes). In such cases, the communication processor ("ATM layer unit") can be either a cell processor or a Segmentation and Reassembly (SAR) unit. Preferably, a single processor can serve multiple (e.g., n) PHYs. In the terms of ATM, processor, PHYs and channels belong to the so-called physical layer. Many references are dedicated to ATM, such as [1] Reif O. Onvural: "Asynchronous Transfer Mode, Performance Issues", Second Edition, Artech House Boston and London, 1995, ISBN 0-89006-804-6, especially chapter 2.4 "Physical Layer"; [2] The ATM Forum, Technical Committee: "Utopia Level 2, Version 1.0", June 1995, [FIG. 2.3B with a single ATM (communication processor) and multiple PHYs]; [3] U.S. Pat. No. 5,485,456 to Shtayer et al.; and [4] U.S. Pat. No. 5,418,786 to Loyer et al.

Coupling multiple PHYs to a single ATM layer can require additional pins to the processor and packages which is not desirable. The present invention seeks to provide systems which mitigate or avoid these and other disadvantages and limitations of the prior art.

It will be appreciated that for simplicity and clarity of illustration, elements illustrated in the Figures have not necessarily been drawn to scale. For example, the dimensions of some of the elements are exaggerated relative to other elements for clarity. Further, where considered appropriate, reference numerals have been repeated among the Figures to indicate corresponding or analogous elements.

DETAILED DESCRIPTION OF A PREFERRED EMBODIMENT

According to the present invention, multiple physical interfaces (PHY) are coupled to two or more communication processors with an address line arrangement which selectively uses lines for transmitting addresses. In other words, the present invention describes an address transferring network (with arrangement 200) between (at least one) ATM layer units (e.g., processors 210, 220) and multiple PHYs (e.g., PHYs in groups X50, X60) in which a bus (e.g., bus X40) coupled between the ATM layer units and the PHYs has shared lines (e.g., lines X44, X45). This has, among others, the advantage that a variable number of addresses which can be transmitted from the processors to the PHYs or vice versa is in relation to the number of PHYs which are part of the communication system.

Although the total number of address lines in the bus is less than the total number of address connections (i.e. I/Os) of the processors, the available address lines are efficiently used. The present invention shows how some address lines are selectively switched temporarily to an active state while others are switched temporarily to an inactive state.

Figure 1:
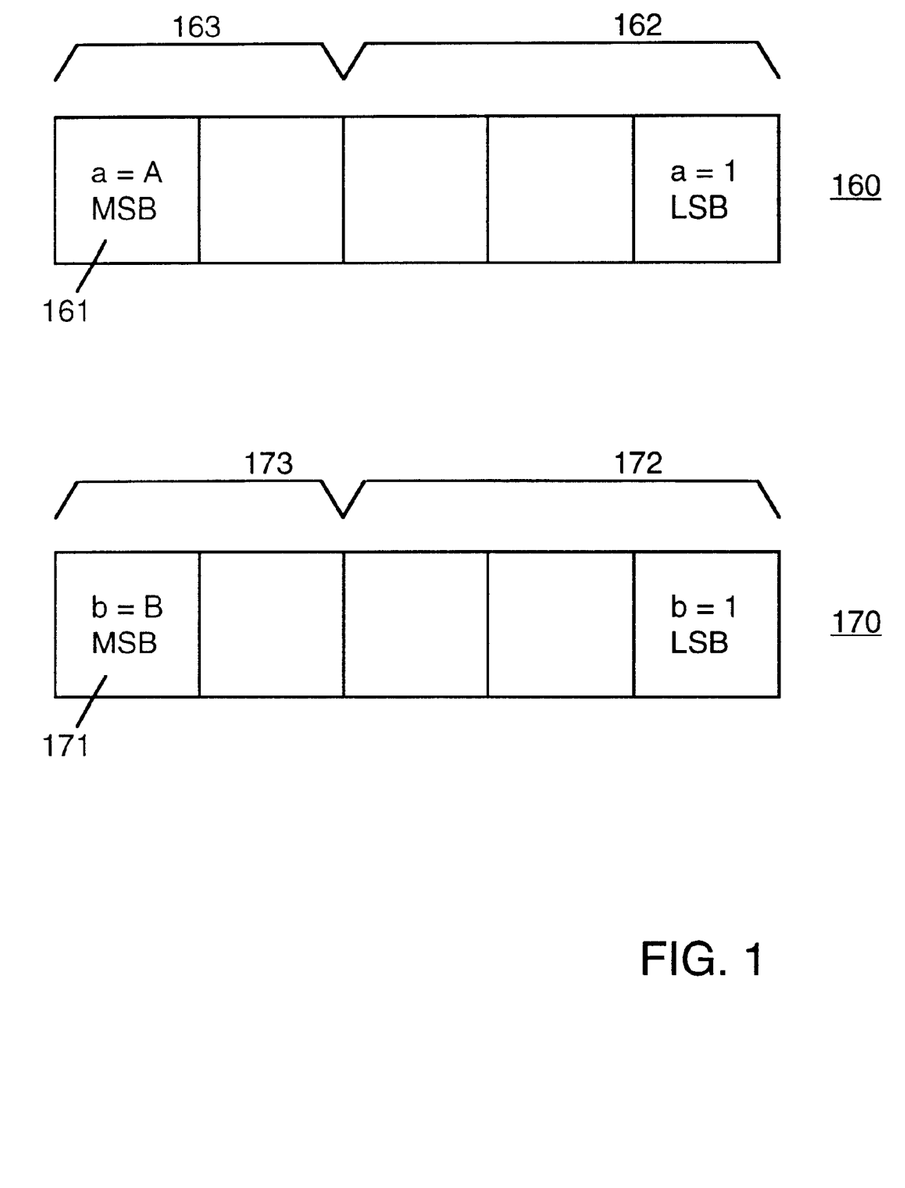
FIG. 1 illustrates simplified block diagrams of first and second addresses provided by first and second processors, respectively.
Figure 2:
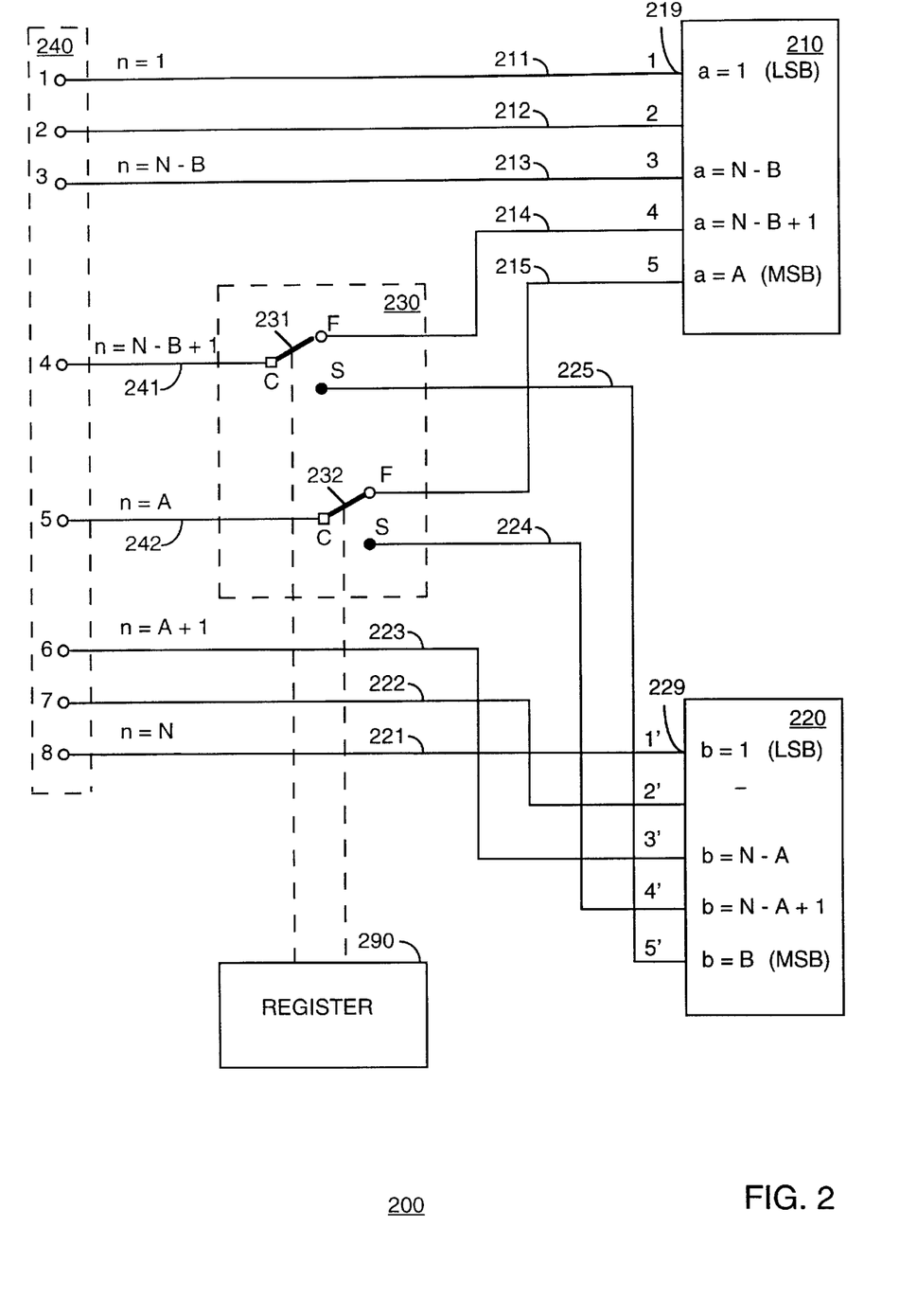
FIG. 2 illustrates an address line arrangement coupled to first and second processors according to the present invention.

FIG. 1 illustrates simplified block diagrams of address 160 provided by a processor (e.g., processor 210 in FIG. 2) and address 170 provided by a second processor (e.g., processor 220 in FIG. 2). Address 160 has a=1 to a=A address bits 161 (hereinafter "bits") which are classified into groups 162 and group 163. Similarly, address 170 has b=1 to b=B address bits 171 which are classified into groups 172 and 173. Groups 162 and 172 each comprise at least a bit of a first significance, and groups 163 and 173 each comprise at least a bit of a second, opposite significance. For example, in group 162, bit a=1 is the least significant bit (LSB); in group 172, bit b=1 is the LSB; in group 163, bit a=A is the most significant bit (MSB); and in group 173, bit b=B is the MSB. According to the invention, the bits of groups 162, 163, 172 and 173 can be transmitted in different sets of address lines (details later). The classification of addresses 160 and 170 in groups is optional. For example, group 162 can optionally comprise all A bits while group 163 does not have any bits (or vice versa), and group 172 can comprise all B bits while group 173 is empty (or vice versa).

The present invention is conveniently explained for an example with A=5 (e.g., bits 1 to 3 in group 162, bits 4 to 5 in group 163) and B=5 (e.g., bits 1 to 3 in group 172 and bits 4 to 5 in groups 173). Such assumptions are convenient, but not important for the present invention. Persons of skill in the art are able, based on the description herein, to apply an other significance classification and other numbers A and B without departing from the scope of the invention.

Figure 4:
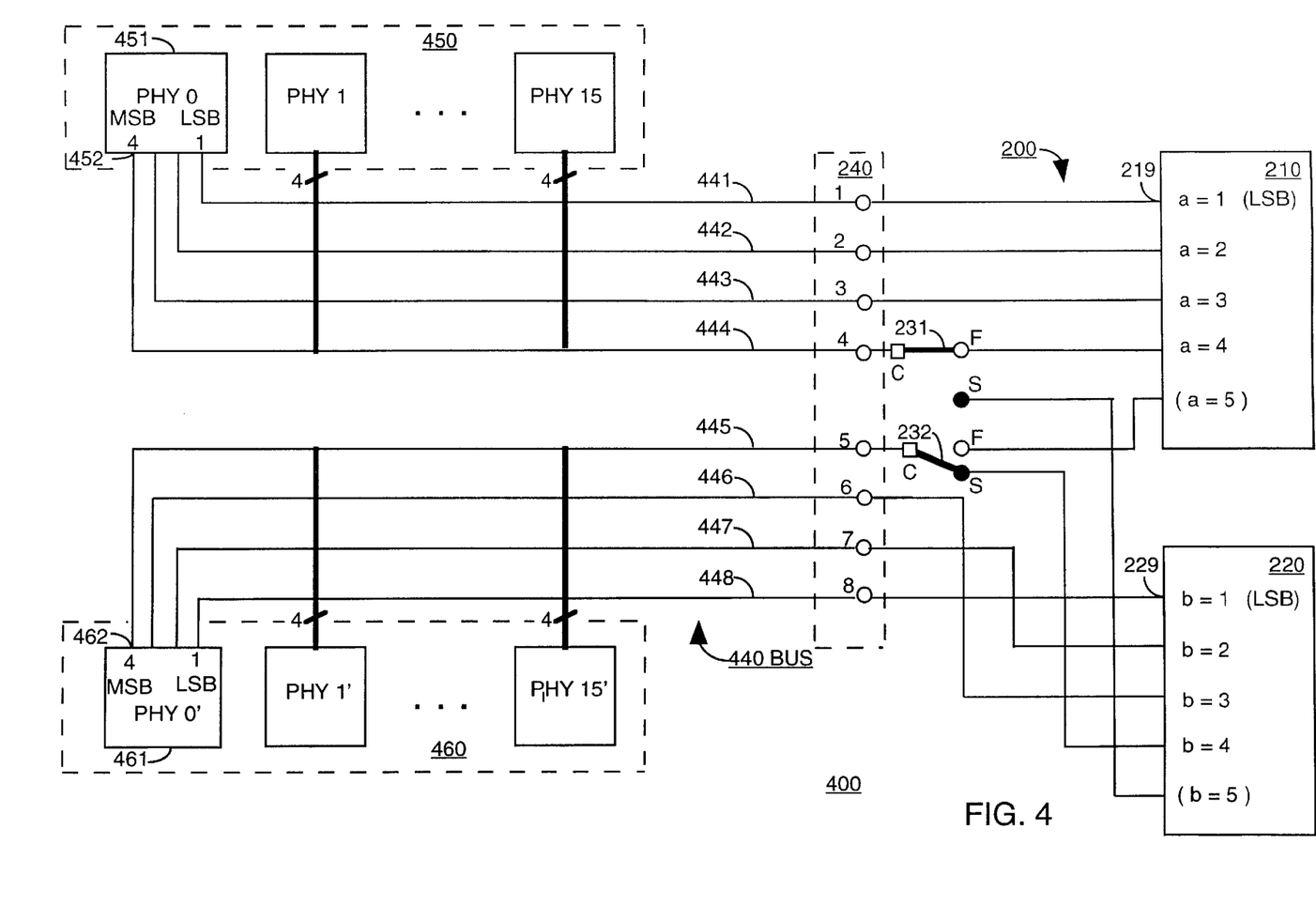
FIG. 4 illustrates a first communication system using the arrangement of FIG. 2 in a first embodiment of the present invention.
Figure 5:
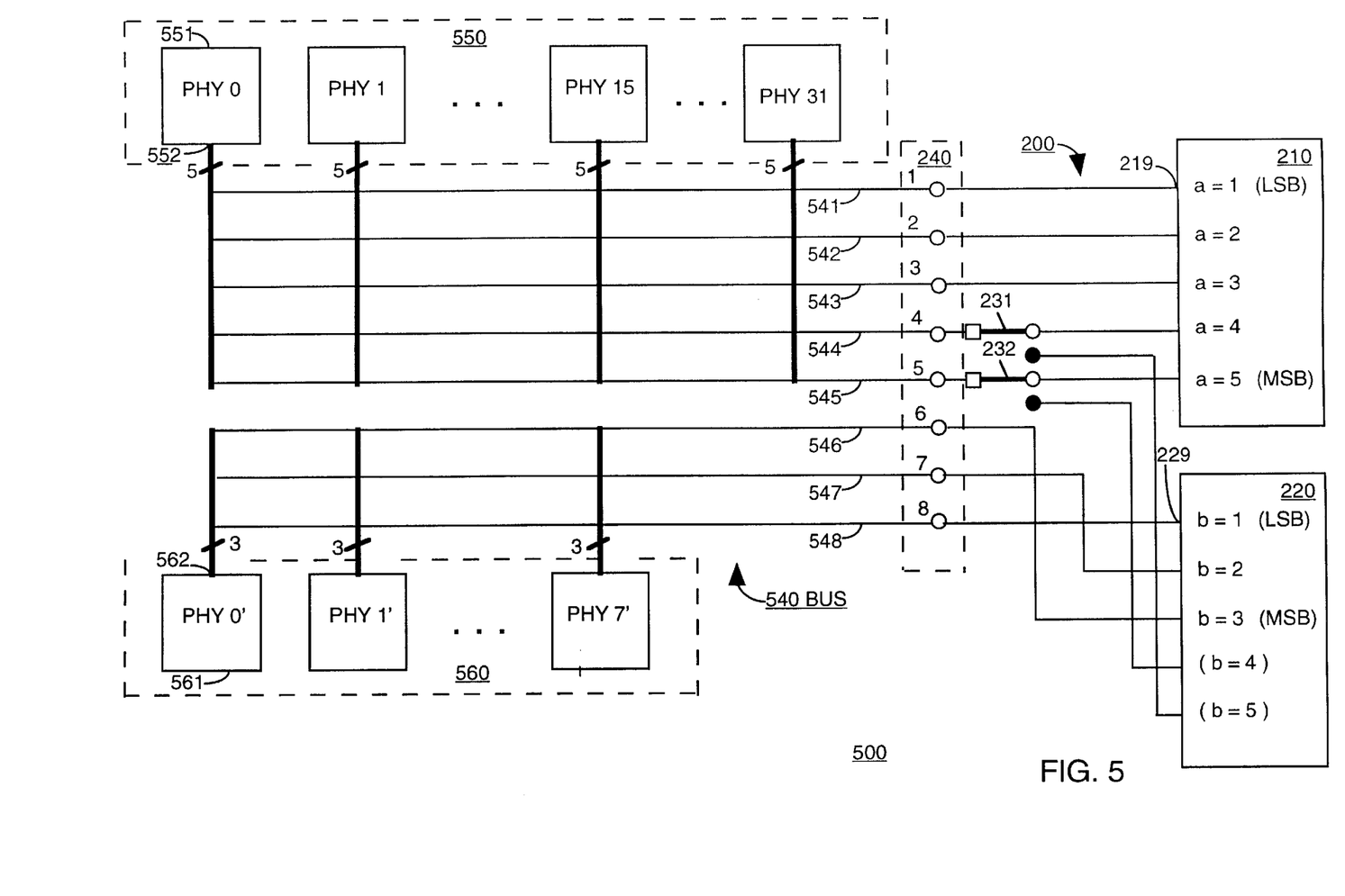
FIG. 5 illustrates a second communication system using the arrangement of FIG. 2 in a second embodiment of the present invention.
Figure 6:
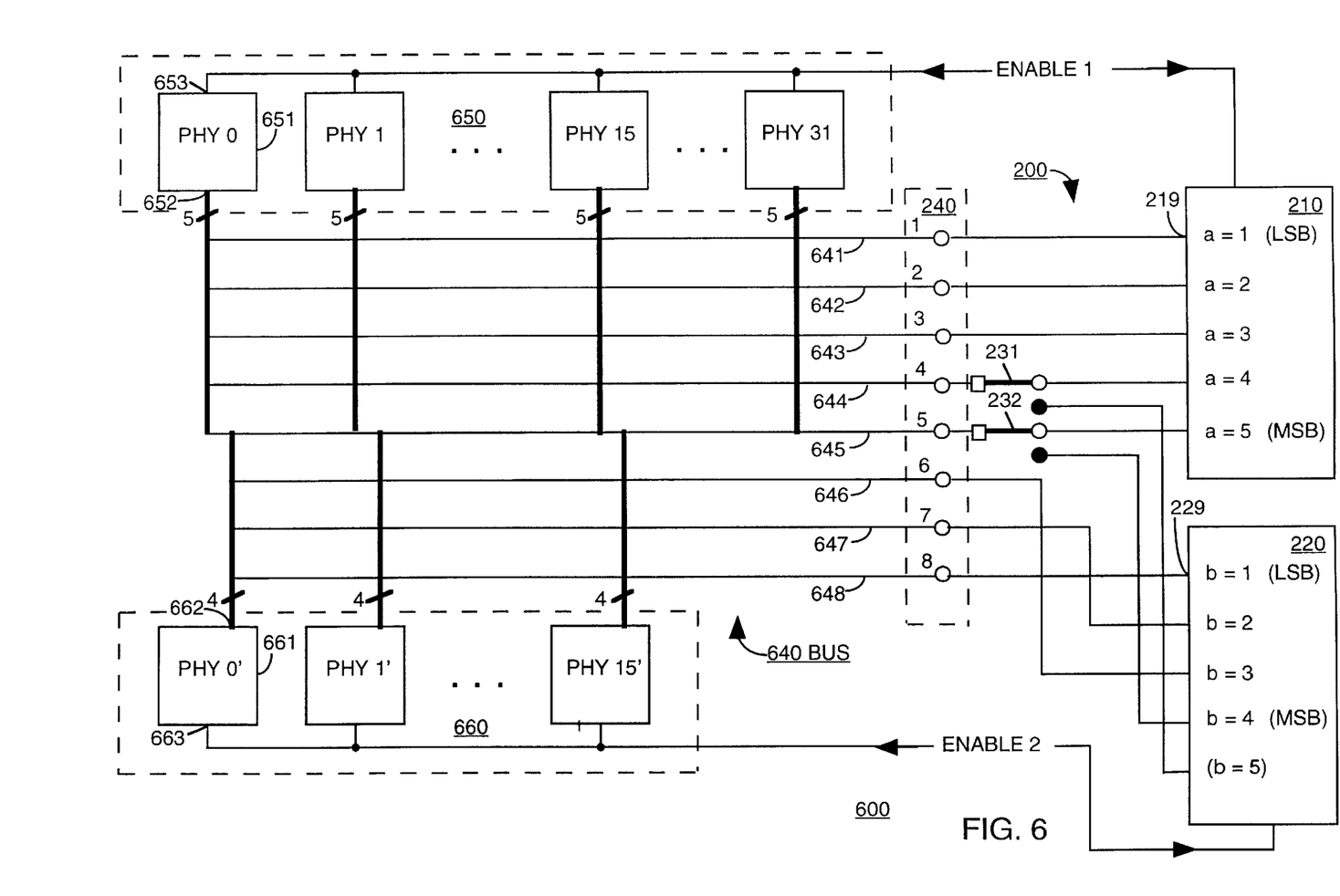
FIG. 6 illustrates a third communication system using arrangement of FIG. 2 in a third embodiment of the present invention.

For example, during polling, the communication processors (e.g., in FIG. 2) consecutively sends incrementing addresses to the PHYs (e.g., see FIGS. 4–6). If, for example, all bits of a 5-bit address are used, address "0 0 0 0 0" corresponds to the first PHY ("PHY 0"), address "0 0 0 0 1" to its neighboring, second PHY and "1 1 1 1 1" corresponds to the last PHY ("PHY 31") from a group of $2^5=32$ (2 to the power of 5) PHYs. For convenience of explanation herein and only to give non-limiting examples, when bits (or associated hardware elements such as address terminals) are given horizontally, the bit on the rightmost position is the LSB, and the bit on the leftmost position is the MSB. For example, the LSB="0" in an old address 0 0 0 0 0 for PHY 0 is incremented to LSB="1" so that the new address 0 0 0 0 1 refers to neighboring PHY 1.

FIG. 2 illustrates address line arrangement 200 coupled processors 210 and 220 according to the present invention.

For the purpose of explanation, FIG. 2 is intended to give only an example but is not limited thereto. Line arrangement 200 comprises lines 211–215, 221–225, 241–242, a plurality of N terminals 240 (collectively enclosed by dashed frame), and switching network 230. Terminals 240 are identified for N=8 by numbers n=1 to n=8. Arrangement 200 can be integrated into a communication system with peripheral devices by a common bus at terminals 240 (not illustrated in FIG. 2, details in FIGS. 4–5).

Processor 210 has A I/Os 219 which are conveniently identified for A=5 by numbers 1 to 5. Similarly, processor 220 has B I/Os 229 identified for B=5 by primed numbers 1' to 5'. Each I/O can, preferably, receive or send (collectively "transmit") a single address bit (cf. bits 161 and 162).

The number A+B of processor I/Os exceeds the number N of terminals by Z. In other words, Z generally is the difference of the sum of processor I/Os (i.e. A+B) and the number N of terminals 240, that is:

$$Z = A + B - N \quad (1)$$

$$2 = 5 + 5 - 8 \text{ (example of FIG. 2)} \quad (2)$$

Controlled by switching network 230, some processor I/Os temporarily share an inner terminal set of Z terminals (e.g., terminals 240-4 and 240-5). In other words, the terminals of the inner set (for bit groups 163 and 173, cf. FIG. 1) are distributed by switching network 230 to some processor I/Os. Switching network 230 has Z=2 switches 231 and 232. Switches 231 and 232 have common connections ("C", symbol □) coupled to terminals 240-4 and 240-5, respectively, Switch 231 has a first selective connection ("F", symbol ○) coupled to I/O 219-4 of processor 210 via line 214 and has a second selective connection ("S", symbol ●) coupled to I/O 229-5' of processor 220 via line 225. Switch 232 has a first selective connection ("F", symbol ○) coupled to I/O 219-5 of processor 210 via line 215 and has a second selective connection ("S", symbol ●) coupled to I/O 229-4' of processor 220 via line 224. For convenience of further explanation, the selective connections are referred to as switch positions S and F. The other processor I/Os are substantially permanently coupled to terminals as follows: At processor 210, I/O 219-1 is coupled to terminal 240-1 via line 211, I/O 219-2 is coupled to terminal 240-2 via line 212, and I/O 219-3 is coupled to terminal 240-3 via line 213. In the example of FIG. 2, I/Os 219-1 to 219-3 carry the bits of group 162. At processor 220, I/O 229-3' is coupled to terminal 240-6 via line 223, I/O 229-2' is coupled to terminal 240-7 via line 222, and I/O 229-1' is coupled to terminal 240-8 via line 221. I/Os 229-3' to 229-5 carry the bits of group 172.

Switching network 230 is, preferably, controlled by register 290 having control lines (dashed) to switches 231 and 232. Persons of skill in the art, based on the description herein, to provide and program register 290 without the need of further explanation.

In other words, the present invention is described as arrangement 200 of a plurality of N address lines n=1 to n=N (e.g., for N=8 lines 211, 212, 213, 241, 242, 223, 222, 221) characterized by the following: (a) Lines n and n+1 are physically located in neighborhood so that no other line is located between them. (b) Line n=1 (e.g., line 211) is substantially permanently coupled to a processor 210 (having A I/Os, int (N/2)<A<N) to transmit the least significant bit (LSB) of processor 210. As convenient well-known abbreviations, symbol "/2" stands for division by 2 and "int" stands for integer part (e.g., int (8/2)=4, int (9/2)=int (4.5)=4). The term "substantially permanently" is intended to include that during operation of processors 210, 220 and arrangement 200, the described connection is not changed. (c) Line n=N (e.g., line 221) is substantially permanently coupled to processor 220 (having B I/Os, int (N/2)<B<N) to transmit the LSB of processor 220. (d) Line n=A (e.g., line 242, A=5) is temporarily coupled to processor 210 to transmit the most significant bit (MSB) of processor 220. (e) Line n=(N−B+1) is temporarily coupled to processor 220 to transmit the MSB of processor 220.

Preferably, in arrangement 200, processor has a=1 (LSB) to a=A (MSB) I/Os 219 and processor 220 has at b=1 (LSB) to b=B (MSB) I/Os 229. Further, optional features of arrangement 200 are: (a) Line n=2 to N−B is substantially permanently coupled to I/O a=2 to a=N−B, respectively, of processor 210. The singular of "line" here and elsewhere is intended to include its plural. For example, line 212 (n=2) is coupled to I/O 219-1 and line 213 (n=8−5=3) is coupled to I/O 219-2. (b) Line n=A+1 to n=N−1 is substantially permanently coupled to I/O b=N−A to b=2, respectively, of processor 220. For example, line 223 (n=5+1=6) is coupled to I/O 229-3' (b=8−5); and line 222 (n=8−1=7) is coupled to I/O 229-2' (b=2). (c) Line n=A−1 is temporarily coupled to I/O a=A−1 of processor 210. For example, line 241 (n=8−5+1=4) is temporarily coupled to I/O 219-4 (a=8−5+1=4) (via switch 231 in S-position). In the example of FIG. 2, n=A−1=N−B+1. (d) Line n=N−B+2 is temporarily coupled to I/O b=B−1 of processor 220. For example, line 242 (n=8−5+2=5) is temporarily coupled to I/O 229-4' (b=5−1) (via switch 232 is S-position). In the example of FIG. 2, n=N−B+2=A.

Figure 3:
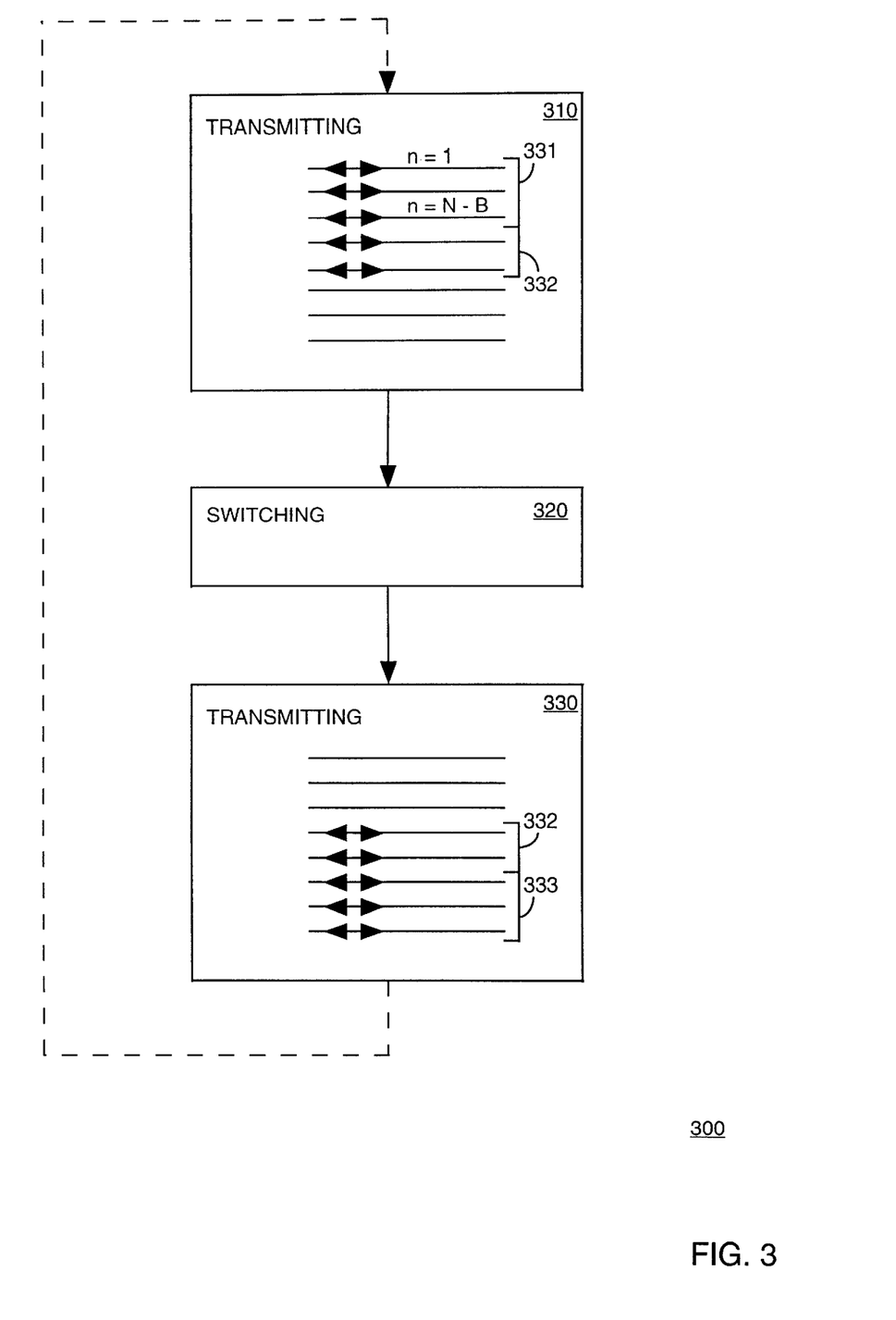
FIG. 3 illustrates a simplified flow chart diagram of a method of the present invention to operate the arrangement of FIG. 2.

FIG. 3 illustrates a simplified flow chart diagram of method 300 of the present invention to operate arrangement 200 of FIG. 2. Method 300 is a method for transmitting addresses 160, 170 to and from devices (e.g., PHYs) by processors 210 and 220 via common bus 240' with a plurality of bus lines. Method 300 comprises the transmitting steps 310 and 320 which are executed alternatively with switching step 320 between them. FIG. 3 illustrates steps 310, 320 and 330 by blocks. Arrows between the blocks indicate a preferred method flow. A cyclical repetition of method 300 (see dashed arrow from step 330 to step 310) as well as the repetition of single steps are possible without the need of further explanation. Method 300 can start with any step.

In transmitting step 310, arrangement transmits address 160 from processor 210 to the devices (see PHYs in FIGS. 4–5) by a first set 331 of selected lines (e.g., 211—213) which are permanently coupled to processor 210 and . by a second set 332 of selected lines (e.g., 241 and 242) which are temporarily coupled to processor 210 by switching network 230. For convenience of explanation, the line sets are conveniently illustrated within the blocks by a schematic representation of the lines. Bi-directional arrows illustrate the address transmission in the selected lines. In other words, the bits of group 162 (cf. FIG. 1) are transmitted by first line set 331, and the bits of group 163 are transmitted by the second line set 332.

In switching step 320, switching network 230 can be operated to decouple (cancel temporary coupling) second set 332 from processor 210 (changing from F to S connections) and to couple second set 332 of lines to processor 220. In other words, switching network 320 multiplexes addresses I/Os to lines. When performed initially, step 320 can be considered as a setting step for initializing switching network 230 (cf. FIG. 2). Switching step 320 can also be considered as reprogramming register 290. This in an advantage of the present invention. The user can configure the required ATM-system by software without the need of changing hardware. The configuration can take place before operation of the system or during its operation (dynamic reconfiguration). Also, a default configuration can be provided by the manufacturer so that the user has to reconfigure only in same cases.

In the examples, of FIGS. 2–3, the present invention is illustrated by having switches 231 and 232 at one time either both in F-position or both S-position. This is convenient for explanation, but not necessary for the present invention. The switch positions, however, can be different, so that switch 231 can be switched to the F-positions while switch 232 can be switched to the S-position, or vice versa. Those of skill in the art, are able, based on the description herein, to apply other configurations without departing from the scope of the present invention.

Similarly as in step 310, in transmitting step 330, address 170 from processor 220 is transmitted to the devices by the second set 332 of lines and by a third set 333 (e.g., lines 223, 222, 221). The third set is permanently coupled to processor 220. In other words, the bits of group 172 (cf. FIG. 1) are transmitted by third line set 333, and the bits of group 173 are transmitted by the second line set 332.

There is no limitation on the duration of steps 310 and 330. For example, steps 310 and 330 can be performed as long as devices are physically connected to the processors. This can extend to a time measured in millisecond, second, minutes, hours, days, or even years.

FIGS. 4–6 illustrate, by way of example, communication systems 400/500/600 (collectively X00, X=4, 5, or 6) in embodiments of the present invention. Like reference numbers stand for similar elements. In the following text, a reference number with a leading "X" stands also for similar elements in FIGS. 4–6 wherein the "X" equals the figure number. Systems X00 each have group X50 (dashed frames) with $L \leq 2^A$ (2 to the power of A) PHYs X51, group X60 (dashed frames) with $M \leq 2^B$ PHYs X61, bus X40 with e.g., N=8 lines X41 to X48, and arrangement 200 (cf. FIG. 2). PHYs X51 in group X50 are conveniently counted beginning with index 0 and ending with index L−1; and PHYs X61 in group X60 are counted from 0 to M−1 (indices with prime markers). Each PHY X50 has A address terminals X52 counted from 1 (LSB) to A (MSB); and each PHY X60 has B address terminals X62 counted from 1 (LSB) to B (MSB). Terminals X52-1 to X52-A of all PHYs X51 are coupled together to lines X41 to X4A of bus 640, respectively; and terminals X62-1 to X62-B of all PHYs X61 are coupled together to lines X4N to X4(N−B+1) (counting down), respectively. Details are given representative for PHY 451 (index 0) and PHY 461 (index 0') of FIG. 4. The other connections are abbreviated by bus symbols showing also the number of A or B connections from the PHYs to bus 440.

In other words, processor 210 and PHYs X51 and processor 220 and PHYs X61 are coupled such that (a) the LSBs (belonging to bit groups 162 and 172, respectively) are transmitted at the outer edge (e.g., lines X41 and X48, respectively) of bus X40 and (b) the MSBs (belonging to bit groups 163 and 173, respectively) are transmitted by shared lines (e.g., lines X44 and X45) in the physical center of bus X40.

In FIGS. 4–6, the connections between processor I/Os 219 and 229, the terminals of switches 231 and 232 and terminals 240 are the same. Systems XOO are illustrated as performing either transmitting step 310 or 330. It is an advantage of the present invention, that PHYs are coupled to terminals 240 according to their availability.

FIG. 4 illustrates communication system 400 using arrangement 200 of FIG. 2 in the first embodiment of the present invention. In system 400, processors 210 and 220 have A=4 and B=4 active I/Os 219 and 229, respectively. I/Os 219-5 and 229-5' (a=5 and b=5 in parenthesis) remain coupled to the corresponding switch terminals. But they are inactive so that the bits at I/Os 219-5 and 229-5' can assume any logical value (e.g., logical "0", "1" or "tristate") . Group 450 has L=15 (A=4) PHYs 451; and group 460 has M=15 (B=4) PHYs 461. I/Os 219-1 to 219-3 of processor 210 are permanently coupled to terminals 452-1 to 452-3 of PHYs 451 by lines 441–443, respectively (first set). I/Os 229-1' to 229-3' of processor 220 are permanently coupled to terminals 448-8 to 448-6 by lines 448–446, respectively. Switch 231 is in the F-position to couple I/O 219-4 of processor 210 to PHY-terminals 452-4 via line 444; and switch 232 is in S-position to couple I/O 229-4 of processor 220 to PHY-terminals 462-4 via line 445.

FIG. 5 illustrates communication system 500 using arrangement 200 of FIG. 2 in the second embodiment of the present invention. In system 500, processor 210 has A=5 active I/Os 219 to serve 32 PHYs 551 in group 550, and processor 220 has B=3 active I/Os 229 to serve 8 PHYs 561 in group 560. Switches 231 and 232 are both in the F-positions to couple I/Os 219-4 and 219-5 of processor 210 (bit group 163) to the MSB-address terminal 552-4 and 552-5, respectively, of PHYs 551. I/Os 229-4 and 229-5 of processor 220 (at the S-terminals of switches 232 and 231, respectively) are not used for communicating address bits. In other words, the B=3 address bits from processor 220 belong only to group 172.

Distinguishing systems 400 and 500 is convenient for explanation, but not essential. According to method 300 of the present invention, for example, a communication system (a) is operated in method step 310 as system 400, (b) is reconfigured in method step 320 to system 500 (e.g., moving switch 232 from S to F, adding PHYs to group X50, and disabling PHYs in group X60), and (c) is operated in method step 330 as system 500.

FIG. 6 illustrate communication system 600 using arrangement 200 of FIG. 2 in the third embodiment of the present invention. In system 600, processor 220 has A=4 active I/Os 219 to serve 32 PHYs 651 in group 650, and processor 220 has B=4 active I/Os 229 to serve 16 PHYs 661 in group 660. Switch 231 is in the F-position and switch 232 alternates between F- and S-positions. In step 310, processor 210 transmits address 160 via lines 641–645. PHYs 651 in group 650 are enabled by enable signal ENABLE 1. Persons of skill in the art, are able to provide such signals, for example from processor 210, without the need of further explanation. In step 320, system 600 is reconfigured so that shared line 645 is allocated to processor 220. Thereby PHYs 651 in group 650 are disabled (e.g., ENABLE 1 negated) and PHYs 661 in group 660 are enabled (by a similar enable signal ENABLE 2). In step 330, processor 220 communicates with PHYs 661 in group 660.

Optionally in step 330, PHYs 651 in group 650 which have addresses from 1 0 0 0 0 to 1 1 1 1 1 (e.g., MSB=1, PHY 16 to PHY 31, L/2) can be disabled. Processor 210 can access the other remaining L/2 PHYs 0 to PHY 15 in group 650 while processor 220 can access substantially all PHYs 661 in group 660. Having described details of the present invention, the present invention is explained in reference to FIG. 1 and to the examples of FIGS. 4–6 as communication system 400/500/600 with processor 210 providing first addresses 160 with first number A of bits 161 to select a first device (PHY X51), preferably, from a first plurality of devices (e.g., PHY-group 450/550/650) and processor 220 providing second addresses 170 with second number B of bits 171 to select a second device (PHY X61), preferably, from a second plurality of devices (e.g., group 460/560/660). System X00 is characterized by the following: (a) Processors 210 and 220 are coupled to the pluralities of devices by shared bus 440/540/640. (b) The bus has a total number N of bit lines (441–448/541–548/641–648) which is smaller than or equal to the sum of A and B (N≦A+B, e.g., 8=4+4 in system 400, 8=5+3 in system 500, 8≦5+4 in system 600). (c) The bit lines are selectively assigned to a first set (e.g., lines 441–443/541–543/641–643), a second set (e.g., lines 446–448/546–548/646–648), and a shared set (e.g., lines 444–445/544–545/645–645). The first and second sets are, preferably, outer sets and the shared set is, preferably, an inner set. (d) Bits 162 with a first significance (e.g., including LSB) of address 160 (processor 210) are coupled to lines of the first set. Bits 172 with the first significance (e.g., including LSB) of address 170 (processor 220) are coupled to the second set. Bits 163/173 with a second, opposite significance (e.g., including MSB) of addresses 160 and 170 are multiplexed to the shared set. Persons of skill in the art are able, based on the description herein, to modify arrangement 200 and systems X001 without departing from the scope of the present invention. For example, the number of processors can be increased. Or, the significance definition can be reversed so that MSBs are transmitted by the other bus lines and the LSBs are transmitted by the inner bus lines. The two processors can serve as master or slave, respectively (e.g., one processor receiving addresses, the other providing addresses). Or, one processor has a master portions at some of its I/Os and a slave portion at the other I/Os.

While the invention has been described in terms of particular structures, devices and methods, those of skill in the art will understand based on the description herein that it is not limited merely to such examples and that the full scope of the invention is properly determined by the claims that follow.

What is claimed is:

1. A communication system with a first processor providing first addresses with a first number of bits to select a first device and a second processor providing second addresses with a second number of bits to select a second device, said communication system characterized in that
    the first and second processors are coupled to the first and second devices by a shared bus having a total number of bit lines which is smaller than or equal to the sum of first number of bits and the second number of bits, the bit lines are assigned to a first set, a second set, and a shared set and wherein bits with a first significance of said first address are coupled to lines of said first outer set, bits with the first significance of said second address are coupled to lines of said second outer set, and bits with a second, opposite significance of said first and second addresses are multiplexed to lines of said shared set.

2. The communication system of claim 1 wherein said bits with the second significance are multiplexed by a switching network controlled by a register.

3. The communication system of claim 1 wherein said bits with the second significance are multiplexed by a switching network which dynamically reconfigured during operation of said communication system.

4. The communication system of claim 1 wherein said bits with the first significance are least significant bits (LSBs) and said bit with the second significance are most significance bits (MSBs).

5. A method for transmitting addresses to devices by first and second processors via a common bus with a plurality of lines, said method comprising the following steps:

(a) transmitting a first address from said first processor to said devices
        by a first set of lines which are permanently coupled to said first processor and
        by a second set of lines which are temporarily coupled to said first processor by a switching network;
    (b) operating said switching network to decouple said second set of lines from said first processor and to couple said second set of lines to said second processor; and
    (c) transmitting a second address from said second processor to said devices
        by said second set of lines and
        by a third set of lines which are permanently coupled to said second processor.

6. The method of claim 5 wherein in said step (a) address bits of a first significance group are sent by said first set and address bits of a second significance group are sent by said second set and in step (c) address bits of the first significance group are sent by said third set and address bit of said second significance group are sent by said second set.

7. The method of claim 5 wherein in said steps (a) and (b) said bit of said first significance group have less significance than said bits of said second group.

8. An arrangement of a plurality of N address lines n=1 to n=N characterized in that:
    lines n and n+1 are physically located next to each other so that no other line is located between them;
    line n=1 is substantially permanently coupled to a first processor with int (N/2)<A<N bits to transmit the least significant bit (LSB) of said first processor; line n=N is substantially permanently coupled to a second processor with int (N/2)<B<N bits to transmit the LSB of said second processor; line n=A is temporarily coupled to said first processor to transmit the most significant bit (MSB) of said first processor; and line n=(N−B+1) is temporarily coupled to said second processor to transmit the MSB of said second processor.

9. The arrangement of claim 8 wherein
    said first processor has a=1 (LSB) to a=A (MSB) input/outputs (I/Os);
    said second processor has at b=1 (LSB) to n=B (MSB) I/Os;
    line n=2 to N−B is substantially permanently coupled to I/O a=2 to a=N−B, respectively, of said first processor;
    line n=A+1 to n=N−1 is substantially permanently coupled to I/O n=N−A to b=2, respectively, of said second processor;
    line n=A−1 is temporarily coupled to I/O a=A−1 of said first processor;
    line n=N−B+2 is temporarily coupled to I/O n=B−1 of said second processor.

10. An ATM to multiple physical layer devices (PHYs) address transferring network comprising:
    a first processor having a first plurality of address terminals and a second processor having a second plurality of address terminals;
    a first plurality of shared address lines coupled between the first processor and a first subset of the multiple physical layer devices (PHYs) and a second plurality of shared address lines coupled between the second processor and a second subset of the multiple physical layer devices (PHYs); and
    a switch network coupled to a third plurality of shared address lines, the switch network comprising a plurality of switches, each of which has a first terminal connected to either a predetermined one of the first plurality of address terminals of the first processor or a predetermined one of the second plurality of address terminals of the second processor and a second terminal connected to at least one of the first subset of PHYs and the second subset of PHYs, thereby providing a variable number of addresses that can be communicated to the multiple physical layer devices (PHYs).

11. The ATM to multiple physical layer devices (PHYs) address transferring network of claim 10 wherein the first plurality of shared address lines and the second plurality of shared address lines her comprise at least one common address line.

* * * * *

UNITED STATES PATENT AND TRADEMARK OFFICE
CERTIFICATE OF CORRECTION

PATENT NO. : 6,490,283 B1
DATED : December 3, 2002
INVENTOR(S) : Ganor et al.

It is certified that error appears in the above-identified patent and that said Letters Patent is hereby corrected as shown below:

Column 8,
Line 41, change "n=B" to -- b=B --.
Line 46, change "n=N-A" to -- b=N-A --.
Line 50, change "n=B-1" to -- b=B-1 --.

Column 10,
Line 4, change "her" to -- further --.

Signed and Sealed this

Tenth Day of June, 2003

JAMES E. ROGAN
*Director of the United States Patent and Trademark Office*